United States Patent [19]
Forkner et al.

[11] 3,855,765
[45] Dec. 24, 1974

[54] LADDERLESS, CONTINUOUSLY USABLE, RAPID FRUIT PICKER AND CONVEYOR

[75] Inventors: Claude E. Forkner, Deland; Charles T. O'Rork, Jr., Orlando, both of Fla.

[73] Assignee: F & O Research and Development Company, Deland, Fla.

[22] Filed: Dec. 29, 1972

[21] Appl. No.: 319,619

[30] Foreign Application Priority Data
Jan. 7, 1972 Great Britain.................... 891/72
Feb. 11, 1972 Great Britain.................. 6614/72

[52] U.S. Cl. .............................................. 56/340
[51] Int. Cl. ............................................ A01g 19/08
[58] Field of Search ........... 56/339, 340, 332, 334, 56/336–338

[56] References Cited
UNITED STATES PATENTS

| | | | |
|---|---|---|---|
| 390,106 | 9/1888 | Watson | 56/340 |
| 444,884 | 1/1891 | Howell | 56/340 |
| 516,556 | 3/1894 | Stetson | 56/340 |
| 644,168 | 2/1900 | Gibbs | 56/340 |
| 721,154 | 2/1903 | Clark | 56/340 |
| 743,754 | 11/1903 | Rohr | 56/334 |
| 1,482,346 | 1/1924 | Burgess | 56/334 |
| 3,323,297 | 6/1967 | Conradt | 56/339 |
| 3,397,526 | 8/1968 | Barrow | 56/340 |

FOREIGN PATENTS OR APPLICATIONS

| | | | |
|---|---|---|---|
| 1,051,055 | 2/1959 | Germany | 56/340 |
| 901,812 | 7/1962 | Great Britain | 56/340 |

*Primary Examiner*—Russell R. Kinsey
*Attorney, Agent, or Firm*—Julian C. Renfro

[57] ABSTRACT

A hand-operated, lightweight device for rapidly and substantially continuously picking fruit from a tree, involving a picking basket mounted atop an elongate pole. The picking basket is equipped with fingers for engaging fruit and for causing the separation thereof from the tree, with the picked fruit thereafter passing to a container or receptacle on the ground through a fruit conveyor means. Advantageously, our fruit conveyor means is of stretch fabric, which fabric will stretch to an appropriate extent as the fruit passes therethrough. This causes some polishing and cleaning action on the fruit, but most importantly, the use of the stretch fabric will not allow the fruit to attain a speed such that it will be damaged upon reaching the container or receptacle.

10 Claims, 9 Drawing Figures

LADDERLESS, CONTINUOUSLY USABLE, RAPID FRUIT PICKER AND CONVEYOR

BACKGROUND OF THE INVENTION

In the past, a number of hand held devices have been provided for picking fruit such as citrus, apples, peaches, pears and the like. These devices have been expensive, complicated to use, prone to get out of adjustment, and tiring to the user.

Additionally, some designs were such that it is necessary to frequently lower the device from the picking position in the tree, in order that the contents of the picking basket can be poured into a container on the ground. On the other hand, previous devices of the type permitting picked fruit to roll down a chute or sleeve to the receptacle on the ground were, unfortunately, either of such a nature and construction that the fruit frequently accelerated to a high speed and was damaged by contact with the receptacle, or else were heavy, expensive, and gave inconsistent results.

SUMMARY OF THIS INVENTION

In accordance with the present invention, we have provided a lightweight, inexpensive and easy to use fruit picking device of highly advantageous construction. As will be appreciated from a further study of this invention, our device is sufficiently inexpensive as to be possessed by each person that owns even a single fruit tree in his or her back yard, although of course certain embodiments of our invention are entirely suitable for commercial use. Furthermore, our device is sufficiently lightweight as to be effectively used by a girl, woman, or elderly person, because the weight of the device does not increase as fruit is picked, for the picked fruit immediately rolls out of the picking basket portion of our device, down a sleeve or fruit conveyor means of stretch fabric, and into a receptacle on the ground. Because of this arrangement, it is unnecessary for the user to lower the device to the ground for fruit removal, as would of course be necessary if fruit were accumulating therein.

Our novel fruit conveyor means is of stretch fabric of a diameter normally smaller than the diameter of the fruit being picked, and this of course means that the fabric must stretch to some degree to allow the passage of fruit therethrough. This action of the stretch fabric not only desirably decreases the speed of descent of the picked fruit, but also it has the effect of providing a degree of cleaning and polishing to the fruit, thus enhancing its appearance.

It is a primary object of our invention to provide a hand operated, ladderless, lightweight fruit picker which may be used on a substantially continuous basis.

It is another object of our invention to provide a fruit picker of minimum cost, which will pick fruit and deposit same without damage in a box or other receptacle, without at any time causing injury to the trees in which it is used.

It is yet another object of our invention to provide a fruit picker that may be maintained in a raised, operative position without lowering it to the ground to empty it of fruit, as certain prior art devices require.

It is yet another object of our invention to provide a fruit picker utilizing a picking basket with which is associated a novel fruit conveyor means made of stretch fabric, that not only serves to reduce the descent speed of the fruit, but which conveyor means also serves to apply a desirable amount of cleaning and polishing action to the fruit.

It is still another object of our invention to provide a fruit picking device whose construction affords safety as well as good visibility of the fruit to the user while it is being operated, with the operating length of the device being readily adjustable such that it can be used for picking fruit that is located at any height in the tree.

It is still another object of our invention to provide a fruit picker of sufficient strength and sturdiness on the one hand, yet combining the virtues of simplicity, low cost, and a high degree of effectiveness on the other hand.

These and other objects, features and advantages of our invention will be more apparent from a study of the appended drawings in which.

DETAILED DESCRIPTION

Figure 1:
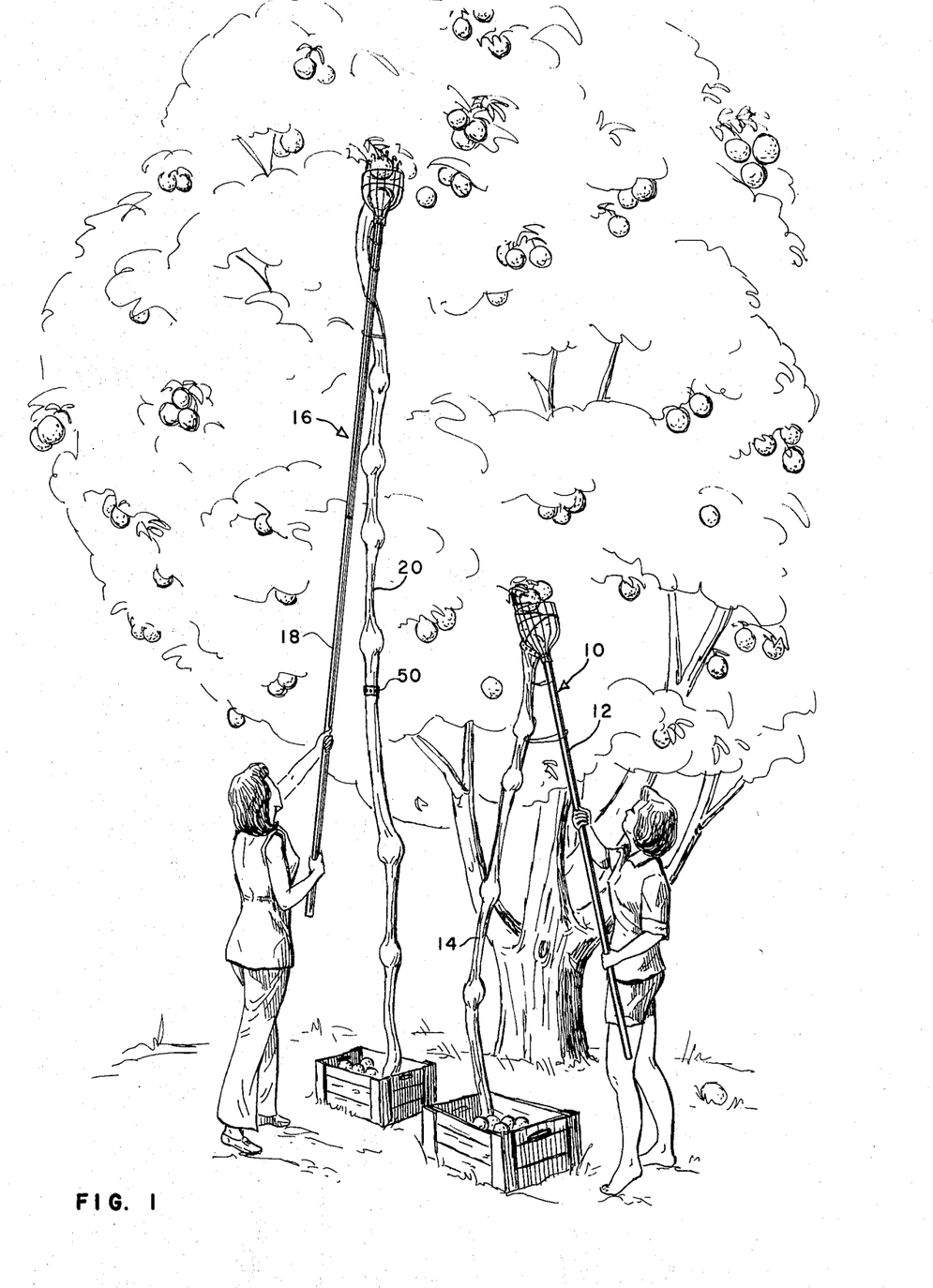
FIG. 1 is a view of exemplary utilizations of devices in accordance with our invention, with it being here revealed that our novel picking basket can be used atop either a comparatively short pole or alternatively atop an elongate pole made up of several sections of shorter length poles.

Turning now to FIG. 1, it will there be seen that we have illustrated the use of our hand operated fruit picking device for rapidly and substantially continuously picking fruit. More precisely, we have illustrated in FIG. 1 two such devices, device 10 having a pole 12 of comparatively short length, and device 16 having a much longer pole 18. Common to each of these devices is a fruit picking basket utilized for plucking the fruit from the tree and catching same, and fruit conveyor means (14 and 20) of stretch fabric for conveying the fruit to the receptacle on the ground as it is picked, without damage thereto. These devices are sufficiently light that they can be held in the operative position by a girl, woman or an elderly person for a substantial length of time, without it being necessary at any time to lower the picking baskets to the ground for the emptying of fruit therefrom, as some of the prior art devices would require.

Because of the fact that there will be instances in which a user would want to use one of our devices alternately at high and at low locations, we prefer to fasten each picking basket securely yet removably to a first pole section, which by way of example may be 6 feet long. Thereafter, one or more additional pole sections can be added as required in order that fruit at higher locations can be picked. Quite obviously the user needs to assert a substantial pull from time to time in order to remove fruit from a tree, so we preferably utilize pole sections that interfit and lock, with a specific movement of the joint being required to therafter separate the sections.

Quite understandably, when one or more additional pole sections are used, a commensurate number of additional fruit conveyor sections also need to be added to the conveyor being used. As shown in FIG. 1, and in greater detail in FIG. 2, we preferably utilize a joint 50 involving snaps, such that a conveyor section can be added or removed quickly and simply. Also, we prefer to use an arrangement at the lowermost portion of each conveyor section, such that it can be laced or otherwise secured to the receptacle to assure that the fruit will be deposited therein.

It will noted from a study of FIG. 1 that several bulges are present in fruit conveyor means 14 and 20, with each bulge of course representing an orange, grapefruit or the like that is descending at a controlled rate to a box or other receptacle on the ground. As discussed hereinafter, each fruit conveyor means is preferably of an appropriate stretch fabric such as stockinet, this being of an inner diameter that is normally smaller than the diameter of the fruit being picked. Because of this, the fruit does not attain a speed during its descent such that it will be damaged upon hitting the ground or the receptacle, with the utilization of the stretch fabric having the additional advantage of bringing about some cleaning and polishing action with regard to the fruit.

Figures 2, 3:
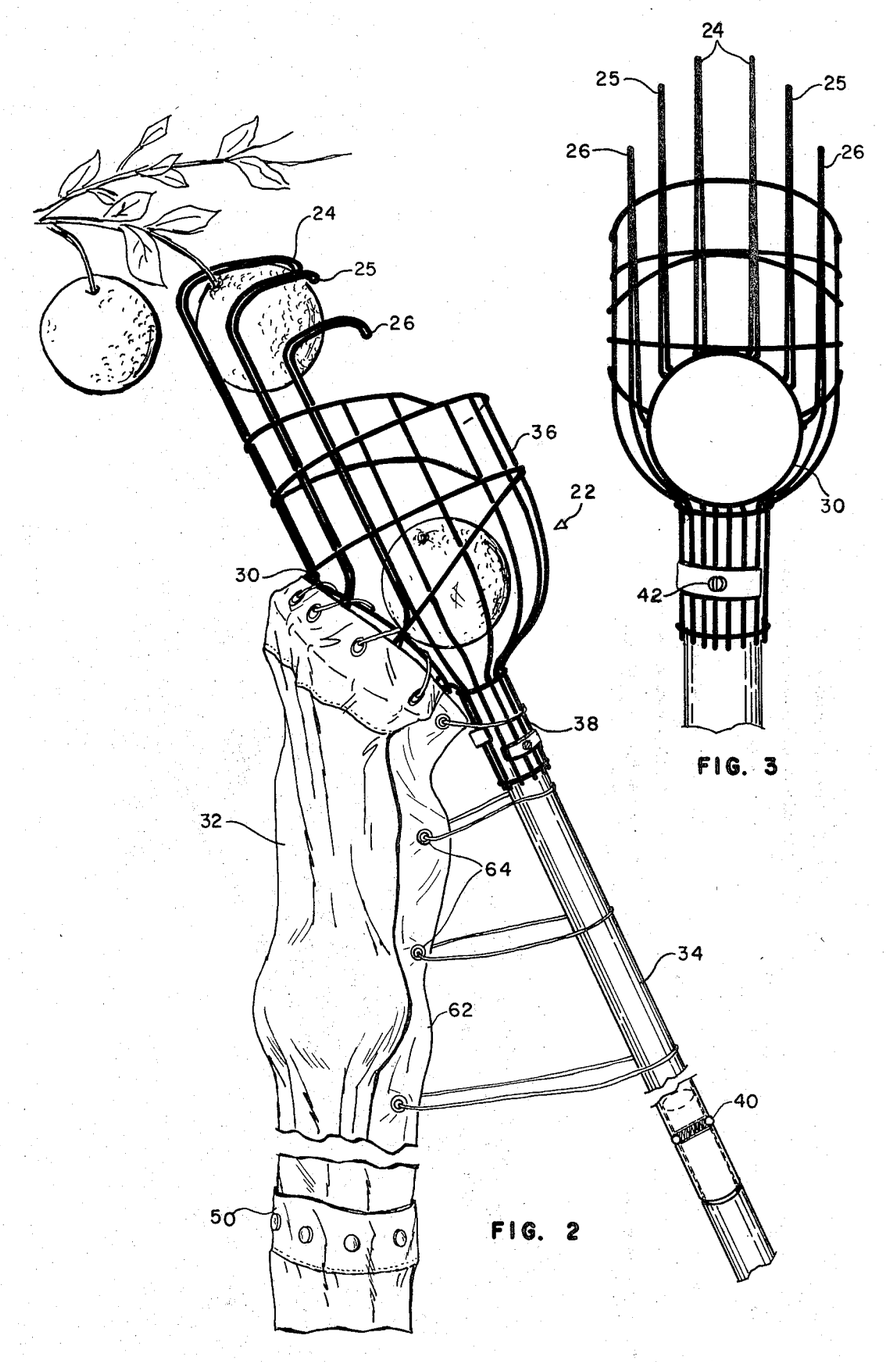
FIG. 2 is a fragmentary view to a larger scale of a primary embodiment of a picking basket in accordance with our invention, this view illustrating the use of picking fingers designed to engage without injury the fruit to be picked, and also showing the novel fruit conveyor means designed to lower the fruit without damage to a receptacle on the ground.
FIG. 3 is a view of the picking basket, turned approximately 90° from the position shown in FIG. 2, with the fruit conveyor means being removed to reveal the outlet means of the basket.

Turning now to FIG. 2, it will be seen that we have shown a picking basket 22 removably secured to the upper end of an elongate pole 34. This primary basket embodiment is preferably of galvanized steel wire, with the intersections spot welded, and all of the wire portions coated by plastic to prevent injury to the fruit. Preferably the first section of the pole, that is, the section nearest the picking basket is of nonconductive material so that in the unlikely instance that the user contacts a power line in the vicinity of the fruit tree, he or she will not be electrocuted.

Figures 4, 5:
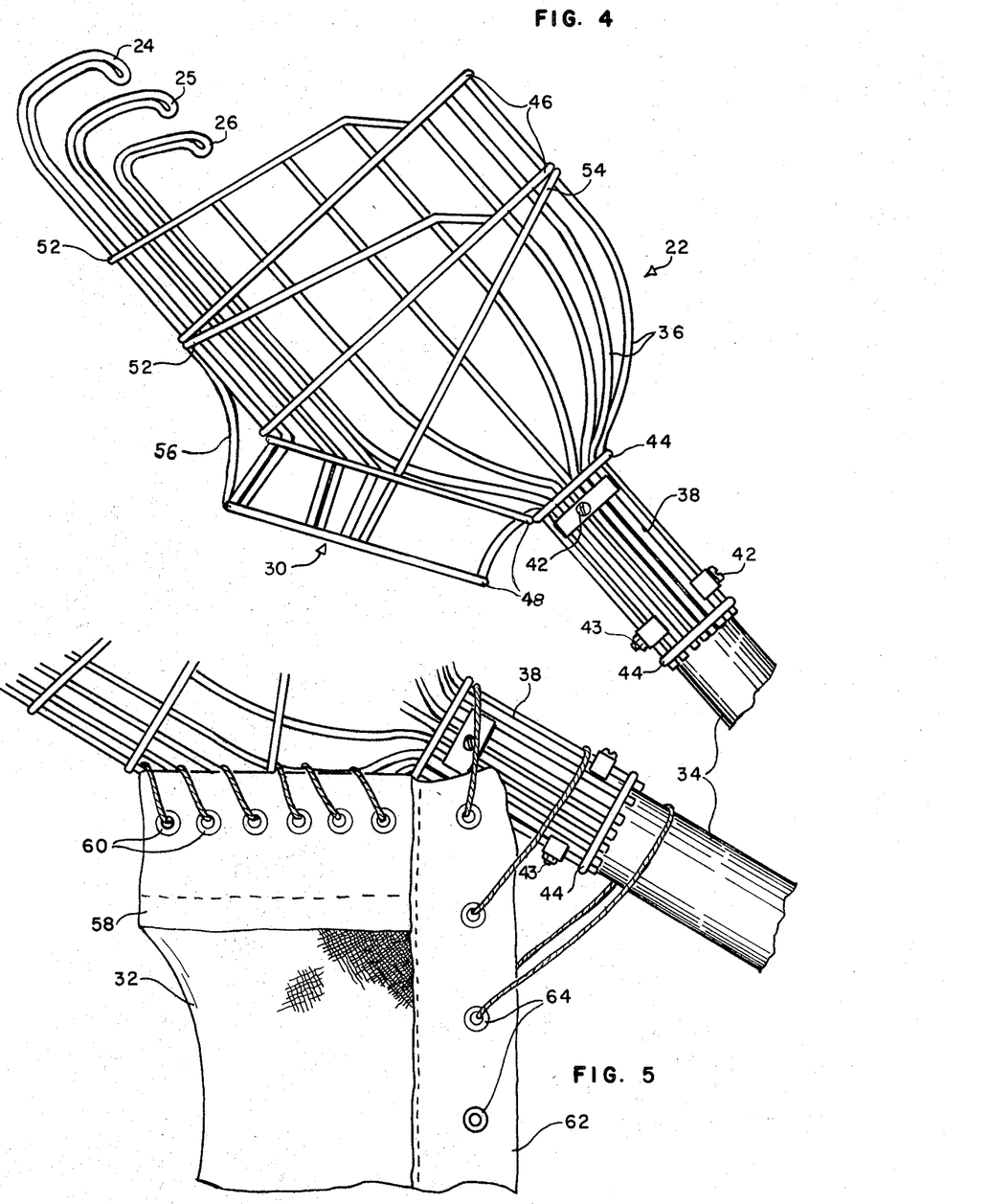
FIG. 4 is a view to an even larger scale of the picking basket to reveal the detailed construction of the exemplary embodiment.
FIG. 5 is a fragmentary view generally relatable to FIG. 4, but showing the specific manner in which the fruit conveyor means may be affixed to the outlet means of the fruit picking basket.

As will be noted from several figures of drawing, but most particularly FIGS. 2 through 4, our novel picking basket 22 is essentially cylindrical in nature and comprises an open upper fruit-receiving end, a lower end defining a handle-engaging socket adapted to receive one end of the elongate hand held pole 34, and a central portion defined between the upper and lower ends, in which central portion is defined a fruit-in-transit containing location. The upper end is defined by a rim and has a forward portion and a rear portion. The forward portion involves a substantially open rim portion, and the rear portion includes a plurality of spaced elongate fruit-engaging fingers. These fingers extend upwardly beyond the rim and are of a hooked configuration so as to be able to at least partially surround fruit to be picked.

These fingers are of sturdy construction, and typically extend for a distance less than half way around the upper edge or basket 22, with these fingers being of sturdy construction, and typically extending for a distance less than half way around the upper edge or rim of the basket. The remaining portion of the upper edge is open. FIG. 2 illustrates the fact that the fingers are hooked to secure the fruit, and have round ends, thus preventing an undesired piercing of the fruit. FIG. 3 reveals that the fingers 24 are of substantial length, the fingers 25 are preferably of intermediate length, whereas the end fingers 26 are of lesser length, with this arrangement being provided for a specific purpose. The user normally picks fruit by inserting two or more of the longer fingers around the fruit in the general manner shown in FIG. 2, such that upon being pulled to separate it from the tree, the fruit will roll down the inside portion of the basket to the center portion thereof. This is to say, to prevent the picked fruit from falling to the ground, the open portion of the basket is normally disposed below the fruit during the picking operation. However, there are of course instances in which the fruit grows in large clusters. In this case, the multiple fingers 24, 25, and 26 will pick several of the fruit simultaneously. If a fruit or cluster is in a comparatively inaccessible position, it is usually more convenient to turn the basket by handle rotation into an orientation in which a shorter finger 25 or 26 can hook the orange, grapefruit, apple or other type fruit. When the user feels that the fruit is securely hooked, he then can rotate the handle back to substantially the original position, such that the basket will again be in a position under the fruit, causing the fruit to fall into the basket when the fruit has been severed from the branch.

FIGS. 3 and 4 reveal the use in a lower portion of the basket of an outlet means 30, through which the fruit caught in the center portion of the basket can thereafter pass under the influence of gravity. The outlet means is preferably directly below the fingers. Secured to the periphery of the outlet means, such as by lacing, is a fruit conveyor means 32, with lacing being utilized to prevent the conveyor from being dislodged as the picking basket is moved through and around branches of a tree; see FIGS. 2 and 5.

Turning now to FIG. 4, it will be seen that the exemplary embodiment of our picking basket is generally bowl shaped, with the open portion typically being round, and the basket continuing to have an essentially round cross section for say two thirds of the depth of the basket. A number of wire means 36 are disposed at substantially equally spaced intervals around the basket, which members curve inwardly and downwardly from the edge or rim of the basket, to form at the base of the basket a cluster in the configuration of an essentially tubular portion 38 designed to receive the upper end of the pole member 34. Two or more bolts 42 are designed to extend through the base portion 38 and through the upper end of the pole, with the removal of nuts 43 and thereafter the bolts making possible a selective removal of the basket. We prefer to utilize a pair of restraining rings 44 around the portion 38 to assure a non-enlargement of the dimension of this part of the device.

The roundness of the cross section of our basket is preferably assured by the use of two or more circumferentially extending form rings 46, to which each of the members 36 are welded at points of contact. The rings 46 are of course on the outside of the members 36 to prevent damage to the fruit passing along the interior of the basket.

Although as previously mentioned, the constructional details of the basket are merely exemplary, we prefer to have the wire members defining the outboard fingers 26 continue for essentially the top to bottom length of the basket, and to form a part of the cluster of wires in tubular portion 38. This straight through construction manifestly amounts to a stronger arrangement than would be the case if the fingers extended only a part of the distance to the base of the basket. The pairs of fingers 24 and 25 may also extend into the portion 38, although in the embodiment shown, the lower portions of the wires associated with fingers 24 terminate at the upper portion of the outlet means 30. Deflector 56 may be used to prevent the snagging of branches of a tree by outlet means 30.

As revealed in FIG. 4, the outlet means is essentially defined by two or so rings 48, with the outermost ring standing an inch or two away from the body of the basket to form a collar so that the attachment of the fruit conveyor means in a firm manner can be facilitated. This outward extension of the outlet means serves to assure that the upper end of the fruit conveyor means will be spread such that it will readily receive the fruit from the central portion of the basket.

Although such is not always required, it usually is highly desirable from the standpoint of strength and rigidity to use two or so semi-circular braces 52 that extend around the portion of the basket at the location of the plurality of fingers. A ring brace 54, if necessary, may be used between the side of the basket opposite the fingers, and the rings 48 of the outlet means.

Turning to FIG. 5, it will there be seen that the upper end of the fruit conveyor means 32 is illustrated in the operative position, with laces such as of plastic, leather, or the like being utilized for securing the conveyor means around the periphery of the outlet means. The main portion of the fruit conveyor means is of stretch material such as stockinet, which is normally of an inner diameter less than the diameter of the fruit. However, this type of material stretches readily, thus enabling the fruit to push its way through and travel to the fruit receptacle under the influence of gravity. This stretching effect necessarily causes a braking action on the fruit, such that it will not attain a speed that will cause injury thereto.

Stockinet material, otherwise known as Surgical Stockinet, is an elastic, knitted fabric, machine made, and in wide-spread use in many hospitals. This material can be purchased in 25 yard lengths, and of a selected diameter. In most instances, we prefer the use of unbleached material of a 4 inch width, for this is suitable for most citrus fruit as well as apples and the like. On the other hand, when picking smaller fruit such as plums, stretch fabric of a smaller diameter may be preferred.

In the embodiement of our invention in which a 6 foot pole 34 is affixed to a picking basket 22, the outlet opening 30 is fitted with a 10 foot or so fruit conveyor 32, which is bound on the top and bottom and say 4 feet or so down one upper side with an attached reinforcement 62, such as canvas. Upper reinforcement 58 will be noted by FIG. 5 to contain a number of grommets 60 through which the reinforcement can be laced to the rings 48 of the outlet means, and side reinforcement 62 will be noted to contain spaced grommets 64. The side binding 62 is tightly laced to the hand held pole 34 at the base of the receiving member, and then loosely laced around the pole for approximately the foot length of the side binding.

As should now be clear, we can rapidly add more pole sections as needed. This is accomplished by the utilization of a snap type bayonet joint, as shown at 40 in FIG. 2. A female end is typically provided at the lowermost portion of the uppermost pole section, and a male end is provided at the uppermost part of each pole section to be added. A ball detent arrangement is preferably utilized in each male end, with the balls thereof being spring loaded in the outward direction, and arranged to enter spaced holes in the female end, disposed to coincide with the location of the balls. As is obvious, the balls snap in place in the female section when the pole joint is assembled, with separation of the joint members being effected by pressing the balls inwardly until the female portion of the joints can be slid off the male section. However, we assert no invention on this type of locking component.

Figure 6:
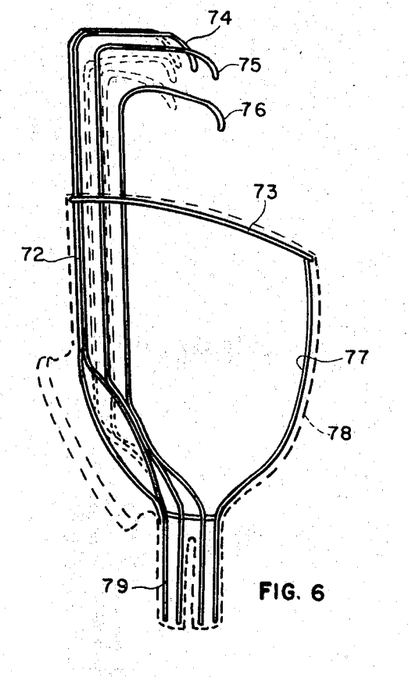
FIG. 6 is a view of an alternate form of a picking basket, involving a skeletal framework over which a receptacle for the fruit may be slid.
Figure 7:
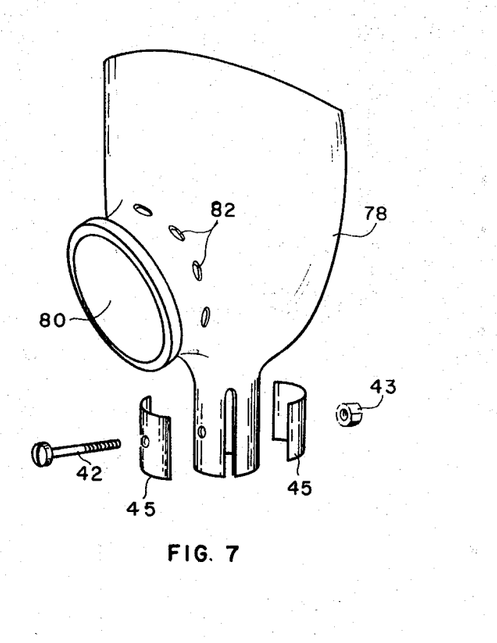
FIG. 7 is a showing of a plastic fruit receptacle slideable over the skeletal framework of FIG. 6.
Figure 8:
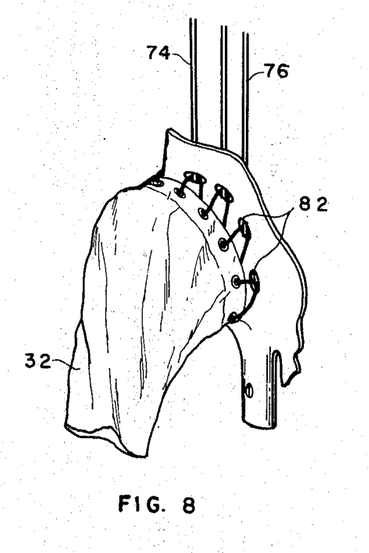
FIG. 8 is a fragmentary view illustrating the lacing detail, by means of which the chute or fruit conveying sleeve is firmly held to the skeletal framework of FIG. 6.
Figure 9:
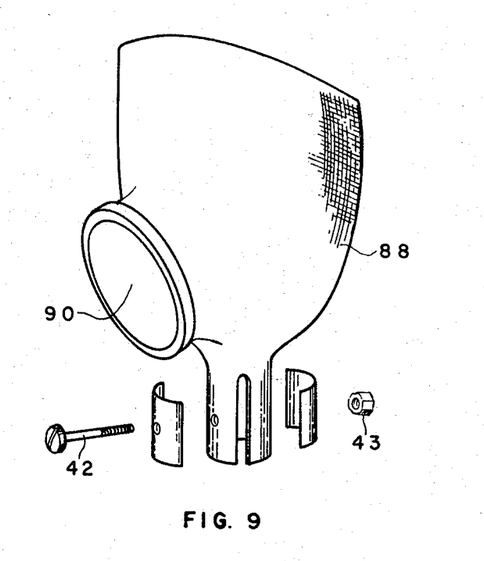
FIG. 9 is a showing of a fruit receptacle of hardward cloth, slidable over the skeletal framework of FIG. 6.

Turning now to FIGS. 6 through 9, it will thereby be seen that we have shown other picking basket arrangements in accordance with this invention. FIG. 6 illustrates a basic framework 72 equipped with finger pairs 74, 75 and 76, over which framework a removable receptacle portion can be slid. Such a portion, otherwise known as a central portion, may be in the form of a plastic receptacle along the lines of that shown in FIG. 7, or may be in the form of a mesh receptacle, such as a hardware cloth device 88 as shown in FIG. 9.

The basic framework 72 is generally along the lines of the picking basket described in connection with the embodiment of FIG. 2, with the one-piece finger members of galvanized steel wire extending down in a continuous manner into the tubular or base portion 79 designed to receive the upper end of the pole. However, the framework of FIG. 6 omits the use of the wire members 36, that extend from the rim of the basket down to the base portion. Fruit picked by the fingers is prevented from falling to the ground by the use of the removable central portion mentioned above, in the form of an essentially conically shaped basket or receptacle, open at the top, through which fruit can easily be seen.

In the embodiment shown in FIG. 7, the plastic receptacle 78 is molded to have an outlet 80 that coincides with the location on framework 72 where the finger wires are spread apart. Thus, when a receptacle or central portion is slid over the framework 72 to the location indicated by dotted lines in FIG. 6, the outlet 80 of the plastic member 78 lines up with the spread apart mid portion of the wire forming the fingers, to define a location for the egress of picked fruit.

Although such may not always be necessary, particularly if the member 78 is of strong plastic, we ordinarily prefer to utilize a generally circular upper hoop member 73, welded to the pairs of fingers, that serves to define with the upper edge of the plastic member, the rim of the fruit-receiving portion. One or more members 77 may be utilized to support the outer edge of the hoop member at the location remote from the fingers.

As is apparent from FIGS. 6 and 7, the central portion 78 is secured in position on the pole and in the proper relationship with the framework 72 by means of a bolt 42, upon the threaded end of which a nut 43 is disposed. Suitable curved washer members 45 serve to spread the force asserted on the base of the plastic member by the bolt.

FIG. 8 reveals the manner in which a fruit conveyor means 32 is secured to the outlet of the central portion of a device in accordance with FIG. 7.

A series of holes 82 are disposed around the outlet 80 of the central portion, thus permitting laces of leather, nylon, plastic or the like to be threaded through a given hole, then around the nearest wire member, and then out again from the same hole. Then the process is repeated in the next adjacent hole, thus to secure the conveyor means, the framework, and the central portion firmly and effectively together. In this way, the user is assured that the fruit conveyor means will not separate from the framework 72 during the passage of fruit out of the central portion and thence into the tube or sleeve 32.

In the mesh embodiment 88 of FIG. 9, such as of hardware cloth, it is not necessary to provide any holes around the outlet 90 corresponding to the holes 82 in FIGS. 7 and 8, for by the very nature of the hardware cloth or other mesh used, there is ample opportunity to pass laces between the fruit conveyor duct and the basic metal framework.

In use, the basket is placed with the pull fingers under and upward around the fruit, such that a downward pull on the hand held pole sends the fruit into the basket, and thereafter through the outlet opening and into the conveyor sleeve 32. The sleeve of course stretches to the size of the fruit rolling through it, and under the influence of gravity, the fruit descends comparatively slowly. The conveyor sleeve serves to at least partially clean and polish the fruit, before it rolls out into the receiving container, and in many instances will do this quite effectively. Our picker can continuously pick fruit as fast as the operator can work, and significantly the operator does not have to lower the basket during the operation. For tall fruit trees, pole and conveyor sleeve extensions can easily be attached, making it possible to reach the tallest tree without the use of a ladder or having to lower the picking basket during the operation.

Our invention can be characterized by its simplicity and the safety accompanying its use. Also it lessens the chance of injury to the tree that so often occurred when ladders were used. The stretch fabric of sleeve 32 is of course detachable, washable, and replaceable, amounting therefore to an arrangement most economical to use. Th ducting can be made in various sizes and substance without charge. For example, for citrus and apples, the larger size is used, but for pecans and apricots, a smaller size is employed.

We claim:

1. A picking basket adapted to be supported by an elongate hand held pole and utilized in picking fruit from a tree on a continuous basis without the need for a ladder or for lowering said basket, said basket being essentially cylindrical in nature and comprising an open upper fruit-receiving end, a lower end defining a handle-engaging socket adapted to receive one end of the elongate hand held pole utilized in reaching fruit located high on a tree, and a central portion defined between said upper and lower ends, in which central portion is defined a fruit-in-transit containing location, said open upper end being defined by a rim, said upper end having a forward portion and a rear portion, said forward portion involving a substantially open rim portion, and said rear portion including a plurality of spaced, elongate fruit-engaging fingers said fingers extending upwardly beyond said rim and being of a hooked configuration so as to be able to at least partially surround fruit to be picked, and an outlet disposed in said central portion and below said fingers, said outlet being located adjacent but above said handle-engaging socket and being of a diameter such that fruit separated from the tree can pass therethrough, and an elongate tubular fruit conveyor means adapted to be attached to to said basket adjacent said outlet, said conveyor means being of stretch fabric of a diameter normally smaller than the fruit being picked, but being capable of stretching at such time as fruit from the central portion of said basket passes through said outlet and enters said conveyor means, and by such stretch action serving to slow the rate of descent of the fruit sufficiently as to prevent damage thereto upon reaching the lower terminus of its travel, said picking basket in use normally being disposed at an angle to the ground, with said rear portion of said upper end of said basket being nearest the ground, such that fruit separated from the tree by the use of said fingers can move downwardly along said fingers, along the interior of said central portion of said basket, then roll immediately to said outlet means, and thence pass downwardly along said conveyor means.

2. The hand-operated device for picking fruit as defined in claim 1 in which said picking basket is at least partly of mesh construction, to enable the fruit to be seen by the user of the device while the fruit is being engaged by the picking fingers.

3. The hand-operated device for picking fruit as defined in claim 1 in which said central portion of said picking basket is of material different from that of said picking fingers.

4. The hand-operated device for picking fruit as defined in claim 3 in which said central portion is of transparent plastic.

5. The hand-operated device for picking fruit as defined in claim 3 in which said central portion is of mesh construction.

6. The hand-operated device for picking fruit as defined in claim 1 in which said elongate pole is comprised of a plurality of interlocking sections, so that the height at which said picking basket is being utilized in a given tree can be selected by the user.

7. The hand-operated device for picking fruit as defined in claim 6 in which said fruit conveyor means can be lengthened at the time additional pole sections are being utilized, by securing on additional tubular sections of stretch fabric.

8. The hand-operated device for picking fruit as defined in claim 6 in which at least one of said pole sections is of non-conductive material.

9. The hand-operated device for picking fruit as defined in claim 1 in which portions of said picking basket logically contacting the fruit being picked are plastic coated to prevent injury to fruit having a delicate skin.

10. The hand-operated device for picking fruit as defined in claim 1 in which picking fingers of at least two different lengths are utilized in an array located atop said picking basket, the fingers adjacent each end of the array being of shorter length than the fingers near the center of the array.

* * * * *

UNITED STATES PATENT OFFICE
CERTIFICATE OF CORRECTION

Patent No. 3,855,765      Dated December 24, 1974

Inventor(s) Claude E. Forkner et al.

It is certified that error appears in the above-identified patent and that said Letters Patent are hereby corrected as shown below:

Item [73] should read -- 2/3 to F & O Research and Development Company, Deland, Fla., a sole proprietorship and 1/3 to Julian C. Renfro, Winter Park, Fla. --.

Signed and Sealed this twenty-second Day of July 1975

[SEAL]

Attest:

RUTH C. MASON
*Attesting Officer*

C. MARSHALL DANN
*Commissioner of Patents and Trademarks*